United States Patent [19]

Miller, III

[11] 4,193,610
[45] Mar. 18, 1980

[54] SHOCK ABSORBING DEVICE FOR AUTOMOBILE BOAT TRAILERS

[75] Inventor: David C. Miller, III, P.O. Box 92, Petaluma, Calif. 94952

[73] Assignee: David Charles Miller, III, Petaluma, Calif.

[21] Appl. No.: 926,351

[22] Filed: Jul. 20, 1978

Related U.S. Application Data

[63] Continuation of Ser. No. 762,984, Jan. 27, 1977, abandoned.

[51] Int. Cl.² ............................................. B60P 3/10
[52] U.S. Cl. ............................................... 280/414 R
[58] Field of Search .................. 248/358 R, 358 AA; 280/179 R, 179 A, 179 B, 414 R, 414 B, 789; 214/505, 506, 84; 296/23 MC, 1 A

[56] References Cited

U.S. PATENT DOCUMENTS

| 3,632,138 | 1/1972 | Whiteley | 280/414 R |
| 3,827,717 | 8/1974 | Whiteley | 280/414 R |
| 3,938,829 | 2/1976 | Anderson | 280/414 R |

Primary Examiner—Joseph F. Peters, Jr.
Assistant Examiner—Randall A. Schrecengost

[57] ABSTRACT

Load absorbing means are combined with an automotive boat trailer so as to restrict flexing of a floater bar connected to the boat hull. The floater bar is passed through a restricted opening in a mounting head which engages the hull of the boat and is joined to a pair of automotive type shock absorbers secured at one end to the frame of the boat trailer.

3 Claims, 8 Drawing Figures

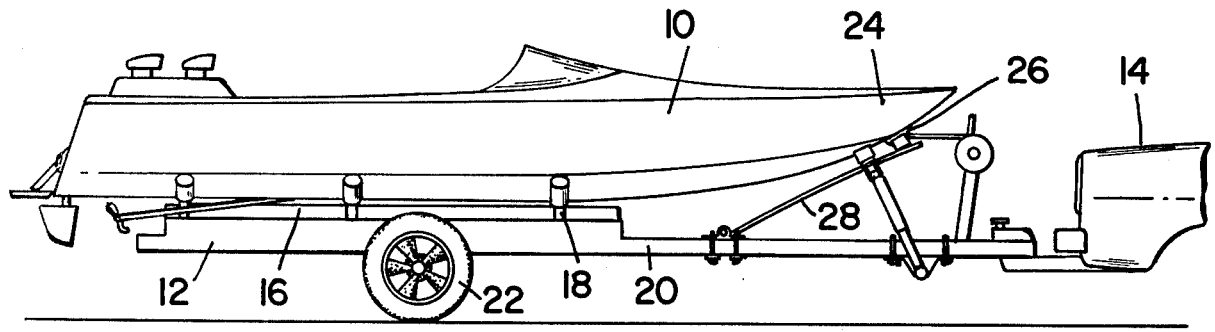
FIG_1
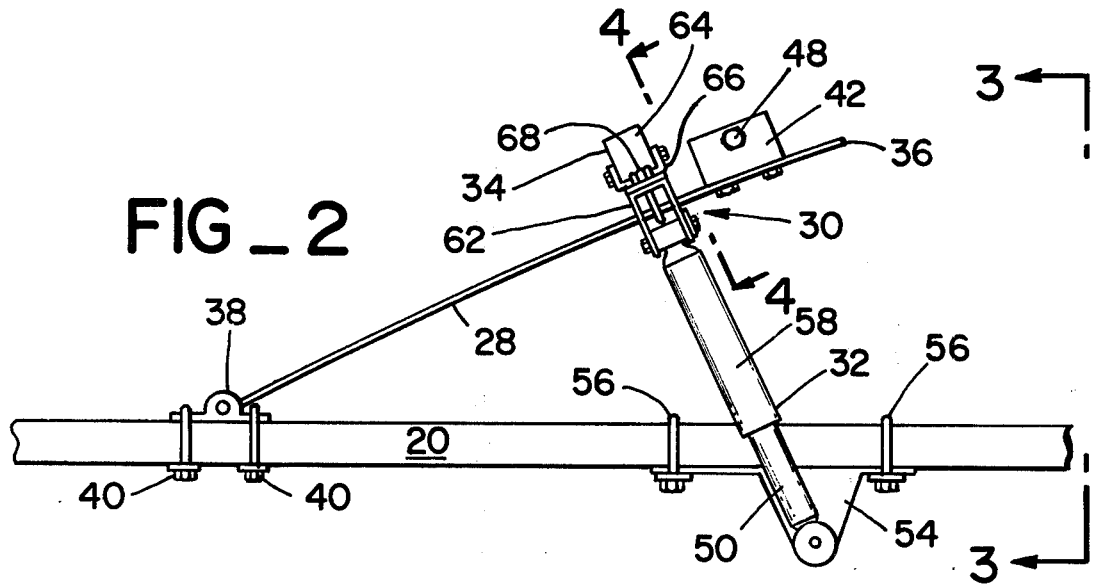
FIG_2
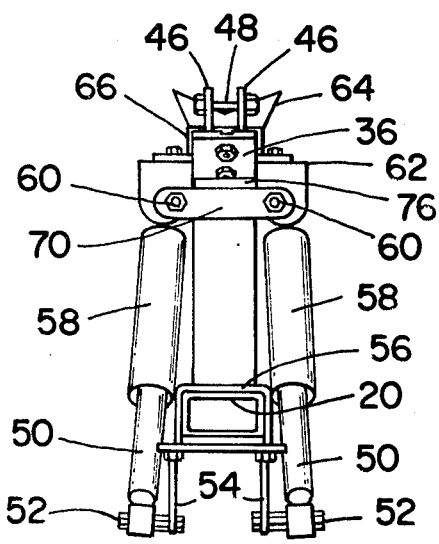
FIG_3
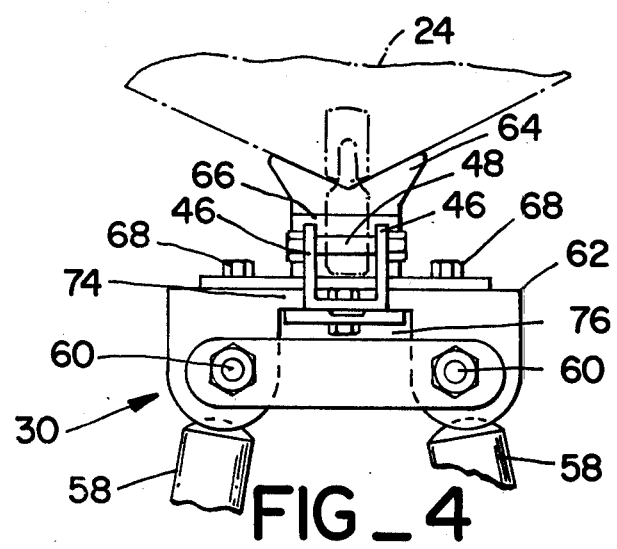
FIG_4

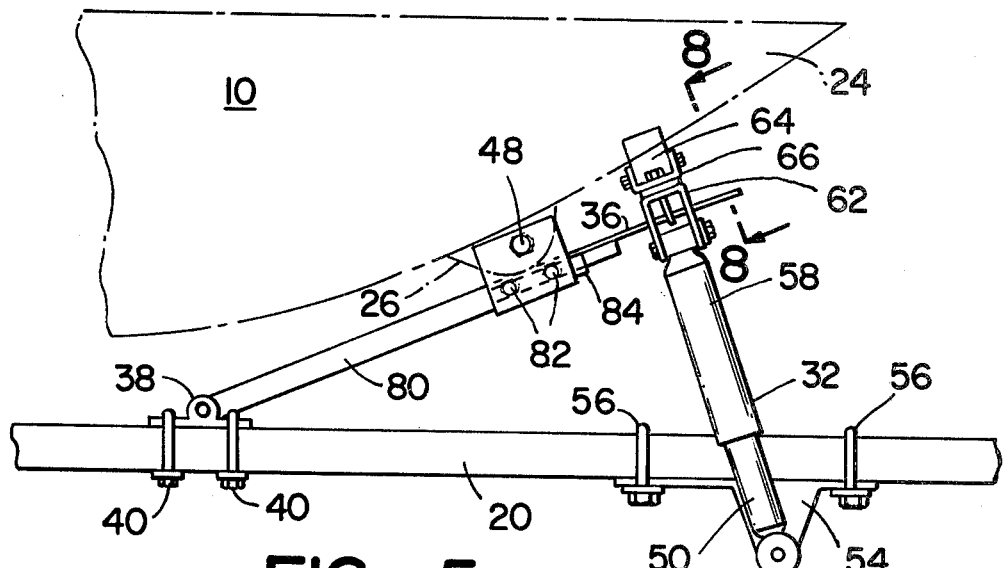
FIG_5
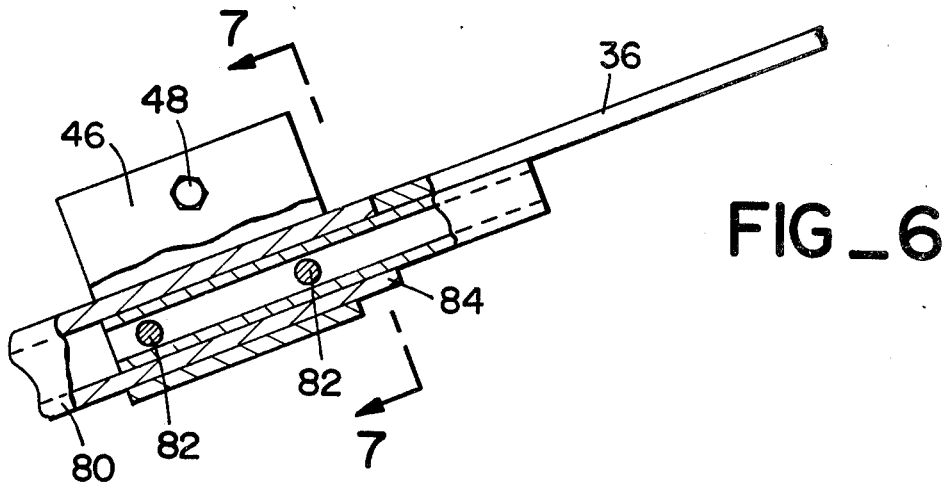
FIG_6
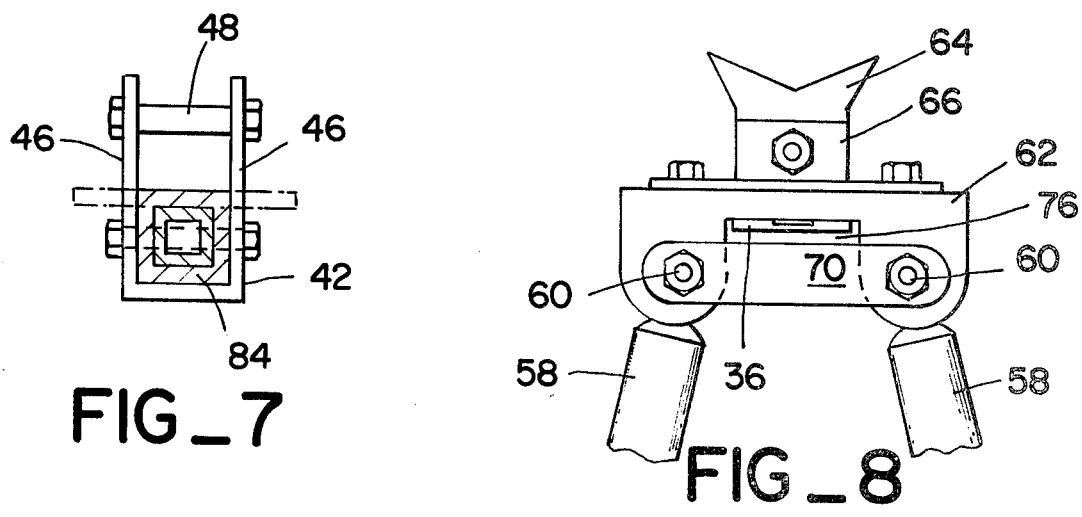
FIG_7
FIG_8

SHOCK ABSORBING DEVICE FOR AUTOMOBILE BOAT TRAILERS

This is a continuation of application Ser. No. 762,984, filed Jan. 27, 1977, now abandoned.

The invention relates to a shock absorbing device for use on automobile boat trailers.

Over the past several years there has been a boom in the sale of pleasure boats small enough to be transported on an automobile boat trailer. A particularly popular type of trailerable pleasure boat widely used in the sport of water skiing is characterized by a hull design having a low freeboard compared to its beam and length overall. Customarily, such low profile boats are secured to the trailer solely by a connection between a mooring bracket on the bow of the boat and a floater bar fixed to the trailer. Inasmuch as the floater bar is free to flex significantly while the boat is on the trailer, bumps and jolts to the trailer during transportation often cause the boat to bounce on the trailer, sometimes causing damage to the hull.

The present invention has for its object the provision of a load or shock absorbing device on boat trailers of the type using a floater bar whereby bouncing of the boat relative to the trailer will be eliminated.

Of the drawings:

FIG. 1 is a side view showing a low-profile type of boat loaded into a boat trailer provided with the invention;

FIG. 2 is a detailed side view of one form of the shock absorbing device constructed in accord with one form of the present invention;

FIG. 3 is a partial view taken along the line 3—3 in FIG. 2 looking in the direction of the arrows;

FIG. 4 is a partial view taken along the line 4—4 in FIG. 2 looking in the direction of the arrows;

FIG. 5 is a detailed side view similar to FIG. 2 showing an alternate form of the invention;

FIG. 6 is a partial side view of a modified floater bar construction;

FIG. 7 is a view, in section, taken along the line 7—7 in FIG. 6 looking in the direction of the arrows; and FIG. 8 is a partial view taken along line 8—8 in FIG. 5 looking in the direction of the arrows.

There is shown in FIG. 1 a low-profile type of boat 10 carried by a trailer 12 pulled by an automobile 14. The type of trailer 12 shown is widely used and comprises longitudinal supports 16 upon which the hull of the boat 12 rests. Various crossmembers 18 are provided as needed to brace the supports 16 and the assembly is mounted on a horizontally disposed frame 20 to which an axle and wheels 22 are joined. As is customary, the boat hull 12 rests upon the longitudinal supports 16 and may, or may not, be secured with tie-downs (not shown). At the bow 24 of boat hull 10 is a mooring bracket 26. Ordinarily the mooring bracket 26 is adapted to fit through a slot (not shown) in a floating bar 28 secured to the frame 20 at its lower end. By reason of this arrangement the floating bar can flex substantially thereby allowing the boat hull 10 to bounce on the trailer 12 whenever the trailer is bumped or jolted.

In the present invention the floating bar 28 is provided with a shock absorbing device 30 adjacent its outer end which effectively absorbs any shocks or load forces tending to bounce the boat on the trailer. As shown in FIGS. 2-4 this load absorbing device comprises a pair of automotive type shock absorbers 32 that are attached to the frame 20 at their lower ends and to a boat-engaging assembly 34 at their upper ends. The assembly 34 straddles the tongue 36 of the floating bar 28 so as to cause the shock absorbers to resist flexing of the tongue 36 relative to the trailer frame 20.

In accord with the teachings of the present invention, the floating bar 28 comprises a base 38 which is secured to the trailer frame 20 by bolts 40. A U-shaped receptacle 42 for a mooring bracket 26 on the bow of the boat hull is secured to the outer end of the tongue 36 of the floating bar. The sides 46 of the receptacle 42 carry a locking pin or bolt 48 which passes through the eye of the mooring bracket to securely lock the boat hull to the floating bar 28. As is best seen in FIG. 3, the shock absorbers 32 comprise movable pistons 50 which are secured by bolts 52 to a mounting bracket 54 attached to the trailer frame 20 by threaded hold-ons 56. The pistons 50 are movable relative to the cylinders 58 which are secured by the bolts 60 to a mounting head 62 that straddles the tongue 36 of the floating bar 28. A crosspiece 70 is secured to one face of the mouting head by bolts 60 which also secure the upper ends of the pistons 58. The crosspiece 70 forms with the central portion 74 of the mounting head 62 an opening 76 through which the tongue 36 of the floating bar 28 extends and by which the tongue is confined. A V-shaped bow pad 64 and its mounting bracket 66 is bolted to the top of the mounting block head 62 by bolts 68 and acts as a support for the bow of the hull 10.

By means of the described arrangement deflections of the tongue 36 of the floating bar 28 are resisted by the shock absorbers. Movement of the boat hull relative to the trailer are effectively decreased and held within acceptable limits and damage to the hull is prevented.

The form of the invention shown in FIGS. 5-8 is an adaptation which may be used whenever the location of the mooring bracket on the boat hull is positioned so low as to preclude the arrangement shown in FIGS. 1-4. In such a case the floating bar may be modified to the form shown wherein a box-like beam 80 is secured to a base 38 and a U-shaped receptacle 42 for the mooring bracket 26 is secured by bolts 82 to the outer end. The outer end 84 of the beam is provided with a flat tongue 36 which passes through the mounting head 62 for the shock absorbers. The tongue 36 is retained within the opening 76 which is closed off by the crosspiece 70 in the manner previously described. In this way, the invention may be adapted to engage the boat hull 10 without regard to the particular location of the mooring bracket 26.

I claim:

1. A shock absorbing device for use on an automobile boat trailer having a frame carrying a boat which comprises:

a flexible floating bar secured at one end to the frame and having a receptacle near its other end adapted to be removably secured to the bow of the boat carried on said trailer;

a boat engaging assembly carried on the floating bar near said receptacle and having a bow pad supporting the bow of said boat; and a pair of automotive type shock absorbers straddling the floating bar, each being attached at its lower end to the frame and being attached at its upper end to one side of the boat engaging assembly to control flexure of the floating bar within predetermined limits, each of said shock absorbers providing a resilient force which tends to maintain contact between said bow pad and bow, said floating bar being resiliently flexed to apply tension to the bow of the boat through said receptacle;

whereby said flexible floating bar and shock absorbers interact applying tension and compression forces respectively to the bow of the boat while simultaneously permitting shock absorbing motion of both said receptacle and bow pad.

2. The shock absorbing device of claim 1 wherein the shock absorbers cant inwardly from their lower ends to form an A-frame structure with said boat engaging assembly to control side-sway.

3. A shock absorbing assembly for use on an automobile boat trailer in accordance with claim 1, wherein the distance between said laterally-spaced portions of such trailer frame to which said respective second ends of said shock absorber are attached is greater than that between said respective first end thereof at their points of connection to said boat-engaging assembly, whereby said shock absorbers cant inwardly from said second ends toward first ends to form an A-frame structure between said boat-engaging assembly and such trailer frame to control lateral motion therebetween.

* * * * *